UNITED STATES PATENT OFFICE.

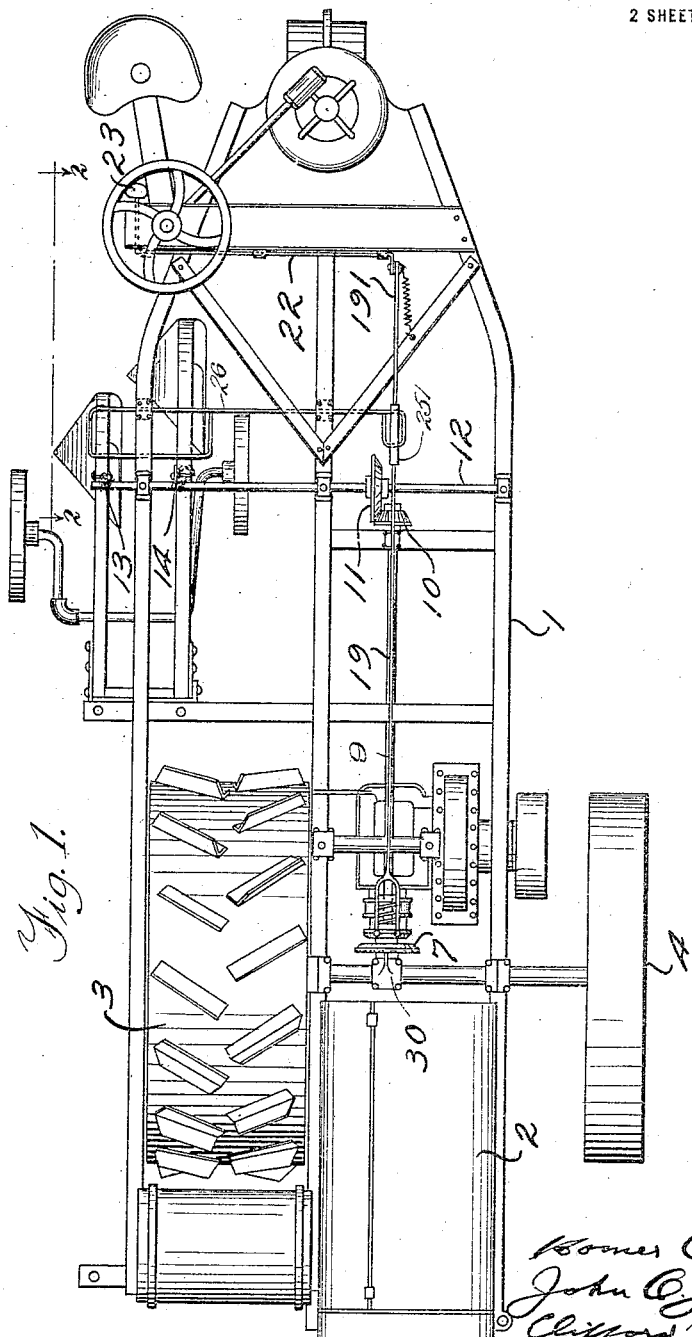

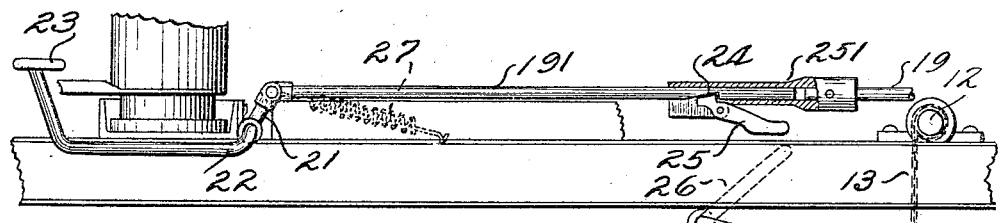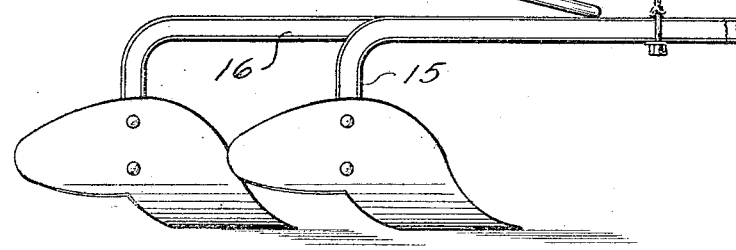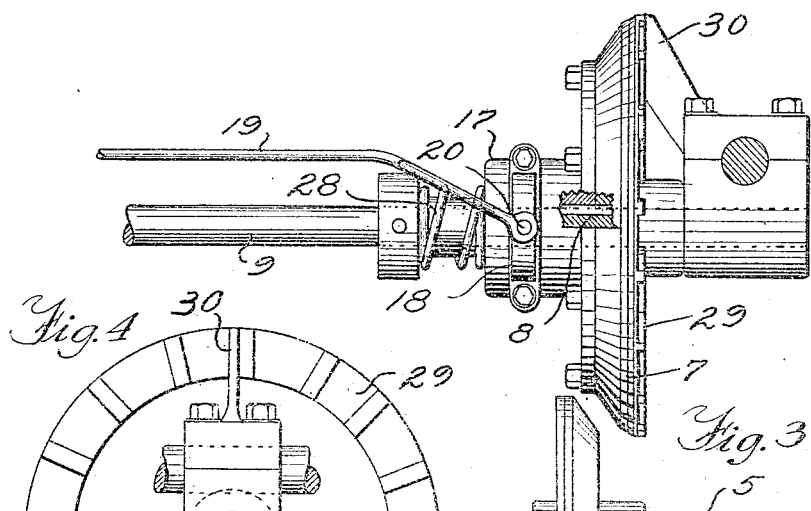

HOMER CURTIS HART, JOHN OSCAR JEVNE, AND CLIFFORD MARTIN STAFF, OF LA CROSSE, WISCONSIN.

PLOW-HOIST.

1,294,261.  Specification of Letters Patent.  Patented Feb. 11, 1919.

Application filed February 18, 1918. Serial No. 217,855.

*To all whom it may concern:*

Be it known that we, HOMER CURTIS HART, JOHN OSCAR JEVNE, and CLIFFORD MARTIN STAFF, citizens of the United States of America, and residents of La Crosse, county of La Crosse, and State of Wisconsin, have invented certain new and useful Improvements in Plow-Hoists, of which the following is a specification.

This invention relates to plow hoists, particularly for plows drawn by traction motors.

The objects of the invention are to provide an improved frictionally driven plow hoist; to provide improved means for retaining the plows at any desired height with respect to their normal plowing position, and particularly to provide improved automatic means for disengaging the frictionally driven part of the plow hoist from its driver simultaneously with the locking of the plows in their raised position.

An illustrative embodiment of this invention is shown in the accompanying drawings, in which—

Figure 1 is a plan view of a tractor provided with the present improvements in hoist mechanism for the plow.

Fig. 2 is a fragmentary side elevation showing the operating pedal for the plow hoist and trip mechanism for controlling the disengagement of the plow hoist from its driving mechanism.

Fig. 3 is a detailed view in side elevation of the friction drive for the plow hoist.

Fig. 4 is a detail in front elevation of the driven friction cone, and shows the construction for locking the cone in any desired angular position.

Plow hoists of the general class to which this invention relates, and which are frictionally driven from a power shaft connected with the motor, differ from the present device in the mechanism employed and means for retaining the plows in lifted position. It is a purpose of the present invention to provide a simplified and reliable construction which may be attached to many different types of tractors or plows while retaining the same essential elements and manner of operation, and requiring modifications only in dimensions to suit the different makes of machines.

It is also particularly the aim of the invention to provide a power driven plow hoist which may be controlled so as to release the hoisting device from its driver when the plows reach any desired elevation, but which becomes automatic in its releasing operation should the operator retain his foot on the controlling pedal until the plows have reached their uppermost position.

The drawings show a tractor of well-known construction to which are pivotally connected a gang of plows to be drawn by the tractor. Only such part of the plow construction as relates to and is connected with the hoist is shown in the drawings. The vehicle frame 1 is shown supporting an engine 2, a driven tractor wheel 3, and an idle supporting wheel 4. A power shaft 5 driven directly by the engine carries fast a friction cone 6 suitable for coöperating with and driving a cone 7 having a splined connection 8 with the plow hoist shaft 9 in order that the cone 7 may serve to rotate shaft 9 while having a motion longitudinally thereof, for the purpose of being disengaged from the driving cone 6. The shaft 9 carries a beveled pinion 10, Fig. 1, meshing with a beveled pinion 11 fast to the transverse shaft 12. This shaft has secured thereto the ends of the plow hoist chains 13 and 14. These chains have one or two turns around the shaft and then pass downwardly to the frame members 15 and 16 of the gang of plows.

With this construction the plows are raised merely by shifting the friction cone 7 into engagement with the cone 6, but the construction to which this invention relates more particularly is the means for automatically disengaging the friction cone 7 when the plows arrive at their uppermost position. The hub 17 of cone 7 is grooved to receive a collar 18 which is reciprocated for the purpose of shifting the cone 7 by means of a rod 19 which is suitably forked at its end to receive pins 20 projecting from the sides of collar 18. The rear end of a separate continuation 191 of the rod 19 is pivotally connected with the bent arm 21 of the transverse rod 22, which at its right-hand end is bent rearwardly to support the operating pedal 23 in a position convenient to the operator's seat. The part 191 of the rod has one or more notches 24 for coacting with a pivoted detent or trip 25 pivoted to a sleeve 251 fast to the rod 19. Thus the rod members 19 and 191 are normally secured together, but a bell-crank lever 26 engages the tail of the detent 25 and disengages it from shaft 19 when the plows arrive at their upper position, due to the fact that one arm of the bell-crank is engaged by one of the plow frames at this time. Such disengagement of the detent 25 results in spring 28 drawing the rod 19 back to normal position and disengaging the friction cone 7 from the friction cone 6. The forward face of the friction cone 7 is provided with a plurality of recesses 29 for the reception of a stationary lock 30 as the cone 7 moves out of engagement with the cone 6. The member 30, therefore, normally retains the plows in hoisted position by preventing reverse rotation of the cone member 7 under the action of the weight of the plows. The two rod portions 19 and 191 are again latched together when the operator raises his foot from the pedal 23 when the spring 27 serves to return the rod 191 into normal relation with the rod 19.

In the operation of the device, the plows may be hoisted by the mechanism described, at any time that the engine is running, whether or not it is clutched to the tractor wheel 3. Assuming that the plows are in plowing position and the operator desires to raise them slightly, or the maximum amount, he depresses pedal 23 thus drawing the cone member 7 into engagement with the cone 6 by means of the rod 19. As soon as he releases the pedal, the springs 27 and 28 restore the mechanism to normal position, the teeth on the front face of the cone 7 engaging the stationary tooth 30 and securely locking the plows in raised position. If the pedal 23 is held down by the operator until the plows reach their hoisted position, the cone 7 is automatically released and moved into engagement with the fixed tooth 30 by the bell-crank lever 26 being engaged by the plow frame and in turn engaging the detent 25, thus permitting the spring 28 to act independently of the spring 27.

In lowering the plows, the friction wheel 7 is shifted merely far enough to disengage it from its detent, and lightly in contact with the opposing friction wheel when necessary to retard the lowering motion.

Although but one specific embodiment of this invention has been herein shown and described, it will be understood that numerous details of the construction shown may be altered or omitted without departing from the spirit of this invention as defined by the following claims.

We claim:

1. In a machine of the character described, the combination with driving mechanism, a pair of coacting friction wheels, means for shifting one of said friction wheels into and out of engagement with the other friction wheel, and a stationary tooth in position to engage and lock the driven friction wheel when the pair of wheels is disengaged, said tooth being ineffective when said friction wheels are engaged.

2. In a machine of the character described, the combination with driving mechanism, of a pair of coacting friction wheels, means for shifting one of said friction wheels into and out of engagement with the other friction wheel, a device normally acting to lock the driven friction wheel when the pair of wheels is disengaged and inactive when said wheels are engaged, and trip mechanism which releases the driven friction wheel from the driving friction wheel after a predetermined engagement between said friction wheels.

3. A machine of the character described, comprising a driving mechanism, said driving mechanism including a pair of coacting friction wheels normally urged apart, means for shifting one of said friction wheels into engagement with the other friction wheel, said means including a pair of normally connected parts, means arranged to disconnect said normally connected parts after a predetermined driving engagement between said friction wheels, and a device for automatically locking the driven friction wheel when disengaged from the driving friction wheel.

4. In a device of the character described, the combination of driving mechanism, said driving mechanism including a pair of wheels, one of said wheels being movable into and out of engagement with the other wheel, the movable wheel being the driven wheel and having teeth on one face thereof, a fixed member for engaging said teeth when the driven wheel is disengaged from the driving wheel, a shiftable bar for shifting the driven wheel into engagement with the driving wheel, a trip device connecting said bar with said driven wheel, and means operated by the driving mechanism for operating said trip device after a predetermined engagement between said friction wheels.

Signed at La Crosse this second day of February, 1918.

HOMER CURTIS HART.
JOHN OSCAR JEVNE.
CLIFFORD MARTIN STAFF.

Copies of this patent may be obtained for five cents each, by addressing the "Commissioner of Patents, Washington, D. C."